(12) United States Patent
Svanberg et al.

(10) Patent No.: US 12,060,186 B2
(45) Date of Patent: Aug. 13, 2024

(54) SEALING DEVICE, AND A PACKAGING CONTAINER

(71) Applicant: TETRA LAVAL HOLDINGS & FINANCE S.A., Pully (CH)

(72) Inventors: Per Svanberg, Malmö (SE); Claes Wallin Klevås, Lund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 17/595,879

(22) PCT Filed: Jun. 24, 2020

(86) PCT No.: PCT/EP2020/067675
§ 371 (c)(1),
(2) Date: Nov. 29, 2021

(87) PCT Pub. No.: WO2020/260379
PCT Pub. Date: Dec. 30, 2020

(65) Prior Publication Data
US 2022/0227517 A1 Jul. 21, 2022

(30) Foreign Application Priority Data

Jun. 28, 2019 (EP) ..................................... 19183300

(51) Int. Cl.
*B65B 51/26* (2006.01)
*B65B 9/20* (2012.01)
(Continued)

(52) U.S. Cl.
CPC .......... *B65B 51/303* (2013.01); *B65B 9/2007* (2013.01); *B65B 51/227* (2013.01);
(Continued)

(58) Field of Classification Search
CPC . B65B 51/22–227; B65B 51/26; B65B 51/30; B65B 51/303; B65B 9/2007;
(Continued)

(56) References Cited

U.S. PATENT DOCUMENTS 2,962,843 A * 12/1960 Hoelzer .................... B65B 9/24
156/244.14
3,482,373 A 12/1969 Morris
(Continued)

FOREIGN PATENT DOCUMENTS

DE 4022209 A1 * 12/1991 ............... B65B 9/20
EP 0577989 A1 1/1994
(Continued)

OTHER PUBLICATIONS

International Search Report (PCT/ISA/210) and Written Opinion (PCT/ISA/237) mailed on Aug. 25, 2020, by the European Patent Office as the International Searching Authority for International Application No. PCT/EP2020/067675.

*Primary Examiner* — Joshua G Kotis
(74) *Attorney, Agent, or Firm* — BUCHANAN INGERSOLL & ROONEY PC

(57) ABSTRACT

A sealing device for forming a transversal seal to a tetrahedral packaging container is provided. The sealing device comprises a sealing element and an imprint ruler arranged at a longitudinal distance from the sealing element. The sealing element is configured to provide a top transversal seal to a packaging container while the imprint ruler is configured to provide a transversal imprint to the same packaging container.

3 Claims, 3 Drawing Sheets

(51) Int. Cl.
  *B65B 51/10* (2006.01)
  *B65B 51/22* (2006.01)
  *B65B 51/30* (2006.01)
  *B65B 61/02* (2006.01)
  *B65B 61/18* (2006.01)
  *B65D 75/50* (2006.01)
  *B65D 75/58* (2006.01)
  *B65D 77/38* (2006.01)

(52) U.S. Cl.
  CPC .............. *B65B 51/26* (2013.01); *B65B 61/02* (2013.01); *B65B 61/18* (2013.01); *B65D 75/50* (2013.01); *B65D 75/5805* (2013.01); *B65D 77/38* (2013.01); *B65B 51/10* (2013.01); *B65D 2203/12* (2013.01); *B65D 2517/0008* (2013.01)

(58) Field of Classification Search
  CPC ............ B31B 70/8131; B31B 70/8133; B29C 66/8491; B65D 75/50; B65D 75/5805; B65D 75/12; B65D 77/38
  See application file for complete search history.

(56) References Cited

U.S. PATENT DOCUMENTS

| | | | |
|---|---|---|---|
| 4,512,138 A * | 4/1985 | Greenawalt | B29C 66/344 53/552 |
| 6,318,894 B1 * | 11/2001 | Derenthal | B65D 33/2533 383/211 |
| 6,371,644 B1 * | 4/2002 | Forman | B65D 33/2541 383/34 |
| 6,665,999 B1 * | 12/2003 | Dierl | B29C 66/84121 53/201 |
| 7,490,451 B2 * | 2/2009 | Matthews | B65B 9/2042 53/139.2 |
| 10,046,874 B2 * | 8/2018 | Aurand | B65D 75/12 |
| 2004/0058103 A1 * | 3/2004 | Anderson | B65D 31/10 428/34.1 |
| 2008/0253701 A1 * | 10/2008 | Wilson | B65D 75/5805 426/396 |
| 2009/0269450 A1 * | 10/2009 | Zerfas | B65B 61/188 426/123 |
| 2016/0167860 A1 * | 6/2016 | Tomsovic | B65D 33/007 53/450 |

FOREIGN PATENT DOCUMENTS

| | | |
|---|---|---|
| EP | 2399845 A1 | 12/2011 |
| EP | 2592017 A1 | 5/2013 |
| WO | 9728045 A1 | 8/1997 |
| WO | 03064273 A1 | 8/2003 |

* cited by examiner

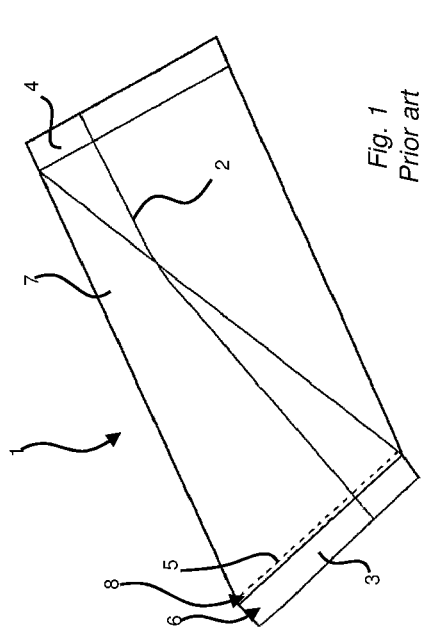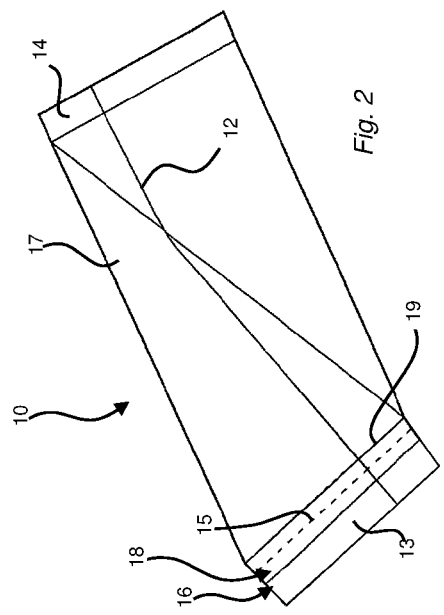

SEALING DEVICE, AND A PACKAGING CONTAINER

TECHNICAL FIELD

The invention relates to a sealing device for providing transversal seals to a packaging material in order to form individual packaging containers. The present invention also relates to a packaging machine, a packaging material, and a packaging container.

BACKGROUND ART

The Tetra Classic® Aseptic carton packaging container has been commercially available for many years. The tetrahedron shape was developed already in the 1950s and the type of packaging container has proven to be very suitable for various food products such as juice drinks, milk, spreadable cheese, ice-lollies, etc. The general technical packaging concept is based on forming a tube by sealing two opposite longitudinal ends of a flat web of packaging material to each other, filling the tube with the content to be packaged, and providing upper and bottom transversal seals to the tube in order to seal individual packaging containers. The tetrahedron shape is obtained by providing the upper and bottom transversal seals approximately perpendicular to each other. During the transversal sealing, or immediately after, the downstream packaging container is separated from the upstream tube by a transversal cut close to the transversal seal.

Different opening solutions can be implemented for the tetrahedron package, such as straw holes, pull tabs, etc. For ice-lollies, the tetrahedron shaped package is provided with a transversal perforation extending across the entire, or parts, of the packaging container width. By gripping and pulling the transversal seal fin adjacent to the perforation, the consumer can remove the entire transversal seal and thereby gain access to the frozen content. In order to function properly, the perforation must not be located at the seal. This means that frozen product can appear at the region of the perforation.

If this is the case, there is a general problem to easily open the perforation since the frozen product will hinder both tear initiation and tear continuation. In order to avoid this problem, it has been suggested to move the position of the perforation closer to the transversal seal. However, such measures will provide additional disadvantages as it will reduce the width of the flat sealed fin, thereby reducing the ability to firmly grip and apply the needed force to open the packaging container. Yet further, as the perforation is located in close proximity to the transition between the transversal seal and the main packaging container body, there is also an increased risk for perforation related integrity issues.

There is thus a need for an improved packaging container of the above-mentioned tetrahedron shape, reducing the risk for packaged content at the area of the perforation, and without introducing the above-mentioned disadvantages.

SUMMARY

It is an object of the invention to at least partly overcome one or more of the above-identified limitations of the prior art. In particular, it is an object to reduce the risk for packaged content to appear at the area of the perforation used to open the packaging container.

To solve these objects, a sealing device for forming a transversal seal to a tetrahedral packaging container is provided. The sealing device comprises a sealing element and an imprint ruler arranged at a longitudinal distance from the sealing element, wherein the sealing element is configured to provide a top transversal seal to a packaging container while the imprint ruler is configured to provide a transversal imprint to the same packaging container.

The sealing device may further comprise a flattening section arranged between the sealing element and the imprint ruler.

The distance between the sealing element and the imprint ruler may be in the range of 5-25 mm, preferably 10-20 mm.

The sealing element may be configured to provide a top transversal seal to a packaging container, and wherein the imprint ruler is configured to provide a transversal imprint to the same packaging container.

The imprint ruler may be configured to provide the imprint above a perforation of the associated packaging container, such that the perforation is arranged between the imprint and the top transversal seal.

According to a second aspect, a packaging container is provided. The packaging container comprises a tetrahedral shape extending between a top transversal seal and a bottom transversal seal, and a perforation for facilitating opening of the packaging container, characterized by a transversal imprint arranged above the perforation such that the perforation is arranged between the imprint and the top transversal seal.

The distance between the imprint and the end of the bottom transversal seal may be in the range of 10-30 mm, such as in the range of 15-25 mm.

The packaging container may enclose a frozen food product, such as an ice lolly.

According to a third aspect, a packaging material is provided. The packaging material is configured to form a packaging container according to the second aspect. The packaging material comprises a top transversal seal area, a bottom transversal seal area, a plurality of folding lines, and a transversal perforation, wherein the perforation is arranged at a distance, and in between the top transversal seal area and the folding lines.

The distance between the top transversal seal area and the folding lines may be approximately 5-25 mm, wherein the perforation is arranged therebetween.

Still other objectives, features, aspects and advantages of the invention will appear from the following detailed description as well as from the drawings.

BRIEF DESCRIPTION OF THE DRAWINGS

Example embodiments of the invention will now be described with reference to the accompanying schematic drawings, in which FIG. 1 is an isometric view of a prior art packaging container;

FIG. 2 is an isometric view of a packaging container according to an embodiment of the present invention;

DETAILED DESCRIPTION

Figure 3:
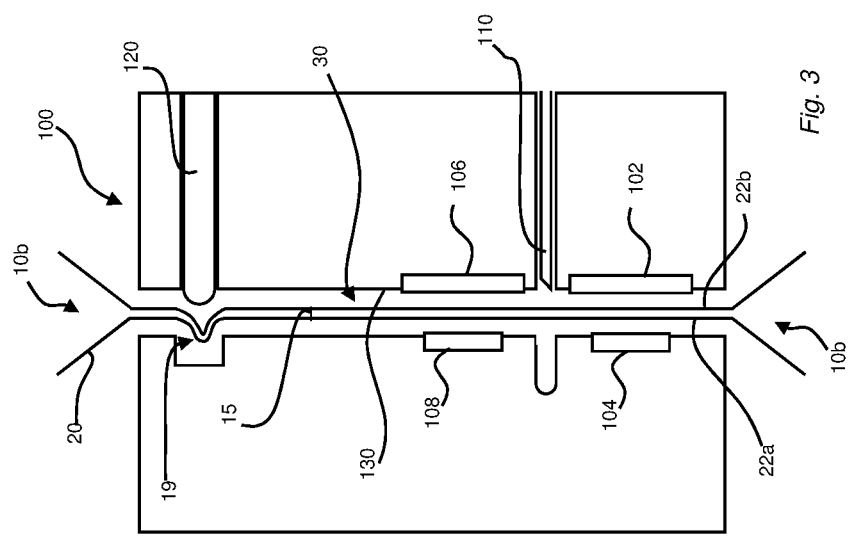
FIG. 3 is a cross-sectional view of a sealing device according to an embodiment of the present invention for manufacturing of a packaging container as shown in FIG. 2.

With reference to FIG. 1 a prior art packaging container 1 is illustrated. The packaging container 1 is typically produced such that a web of a packaging laminate material is first formed into a tube by both longitudinal edges of the web being united to one another in a liquid-tight overlap joint 2. The tube is preferably aseptically filled with its desired content, e.g. flavored water, and subsequently divided by repeated transversal thermal seals 3, 4 alternatingly 90° transversely in relation to one another. Consequently, individual tetrahedral packaging units 1 (which are separated from one another by a cutting mechanism) are formed.

Immediately inside one of the seals 3 a perforation 5 is provided. The perforation is as long as the seal 3, or possibly shorter than the seal 3, whereby opening of the packaging container 1 is facilitated by a tearing action at the perforation, thereby removing a sealed fin 6 from the main body 7 of the packaging container 1. Optionally, if not fully teared the sealed fin 6 is not removed from the main body 7 but it may remain partially attached to the opened packaging container 1.

As described earlier, the packaging container 1 may be manufactured for enclosing a frozen food product, such as an ice lolly. Should the content of the packaging container 1 freeze in the volume 8 between the perforation 5 and the seal 3, it will be very difficult to open the packaging container 1.

An improved packaging container 10 is thereby provided, as illustrated in FIG. 2. As for the prior art packaging container 1 shown in FIG. 1, the improved packaging container 10 is produced by forming a tube of a packaging material, and filling the tube with its desired content. The tube has a longitudinal seal 12, and the filled tube is further sealed by providing repeated transverse thermal seals 13, 14 alternatingly 90° transversely in relation to one another.

A perforation 15 is provided on each packaging container 10, for facilitating opening of the closed packaging container 10 in order to access its content, which may be frozen. The perforation 15 is positioned inside the seal 13, whereby tearing of the perforation 15 will remove a sealed fin 16 from the main body 17 of the packaging container 10. Optionally, if not fully teared the sealed fin 6 is not removed from the main body 7 but it may be remain partially attached the opened packaging container 1.

As can be seen in FIG. 2, the packaging container 10 is further provided with a transversal imprint 19. The transversal imprint 19 is preferably extending across the entire width of the packaging container 10, and in parallel with the transversal seal 13. The imprint 19 is arranged such that the perforation 15 is provided in between the imprint 19 and the transversal seal 13. The imprint 19 is preferably formed by compressing or folding the packaging material of the packaging container 10, such that it forms a barrier for the content of the packaging container 10. Hence, the imprint 19 will prevent, or at least reduce, content to appear in the area of the perforation 15, and especially to the volume 18 between the imprint 19 and the seal 13.

The transverse seal 13 will form the fin 16 facing out from the packaging container 10. At the same time, the packaging container 10 tapers uniformly towards the transverse seals 13, 14 with the result that a frozen food product inside the packaging container 10 will display an apex which can be pushed through the open end (located at the area of the perforation 15) when the fin 16 is removed and the packaging container 10 is opened.

The transversal seal 13 preferably reaches approximately 6 mm into the packaging container 10 in the longitudinal direction. The total width of the fin 16 in the longitudinal direction, including the width of the transversal seal 13, the perforation 15 and the imprint 19 is preferably about 10-30 mm, such as between 15 and 25 mm.

Now turning to FIG. 3, a sealing device 100 is shown schematically. The sealing device 100 is configured to form part of a filling machine for forming and filling a series of packaging containers 10. As such a filling machine is well-known in the art, it will not be described further herein. However, in order to provide the improved packaging container 10, the improved sealing device 100 is needed, which is suggested to replace the existing sealing devices in the filling machine. It should be noted that two identical sealing devices 100 may be provided and arranged in series in the longitudinal direction of the tube, and rotated by 90° relative each other.

The sealing device 100 is configured to act on the tube 30 of packaging material 20, by compressing the tube 30 such that two opposite layers 22*a-b* of the packaging material 20 are brought into contact with each other.

A first sealing element 104 is arranged to provide a bottom transversal seal 14 on a downstream packaging container 10*a*, by moving towards a first anvil 102 and applying thermal energy to the layers 22*a-b* of packaging material 20. Plastic material of the packaging material 20 will thereby melt, and allowing the layers 22*a-b* to adhere to each other thereby forming the transversal seal 14.

A second sealing element 108 is arranged to provide a top transversal seal 13 on an upstream packaging container 10*b*, by moving towards a second anvil 106 and applying thermal energy to the layers 22*a-b* of packaging material 20. Plastic material of the packaging material 20 will thereby melt, and allowing the layers 22*a-b* to adhere to each other thereby forming the transversal seal 13.

The first and second sealing elements 104, 108 may e.g. be induction heating elements, or of any other type being suitable to seal a packaging material 20. They are preferably activated simultaneously, and separated in the longitudinal direction to allow a cutter 110 to fully penetrate the packaging material 20. The cutter 110 may e.g. be a knife, actuated at the same time or shortly after, as the transversal seals 13, 14 are provided, such that the downstream packaging container 10*a* is separated from the upstream packaging container 10*b* and the tube 30.

A ruler 120 is provided upstream the second sealing element 108. The ruler 120 is moveable towards the tube 30, in order to compress the packaging material 20 (i.e. both layers 22*a-b* of the packaging material 20) and thereby form the transversal imprint 19. The ruler 120 may be blunt, as illustrated in FIG. 3, or more sharp depending on the desired properties of the resulting imprint 19.

A flattening section 130 is arranged longitudinally between the ruler 120 and the second sealing element 108. The flattening section 130 is a flat surface which is configured to push the layers 22*a-b* of the packaging material 20 towards each other such that a relatively flat section of packaging material is obtained, containing a minimum of product content.

The packaging material 20 is fed into the sealing device 100 such that the perforation 15, which is pre-applied to the packaging material 20, is positioned at the flattening section 130.

Since the perforation 15 shall be located at a position within the flat section 18, there is a need to control the position of the perforation 15. This is made by adjusting the protrusion of the ruler 120 giving an adjustment of the length of the packaging container 10. This flat section 18 is then pushed together, thereby squeezing away most of the product, by means of the shape of the sealing device 100. The flattening section 130 ends at the ruler 120 such that the imprint 19 will act like a stiffener of the packaging material 20, thereby reducing the risk that the content of the packaging container 10 enters into the flat section 18 of the packaging container 10. Due to the width of the flat section 18, it is possible to locate the perforation 15 within that section 18 and at safe distance to highly stressed and exposed positions, thereby reducing the risk for integrity issues related to the perforation.

Also, the resulting shape of the packaging container will provide for a differentiation in appearance and improved décor.

Figure 4:
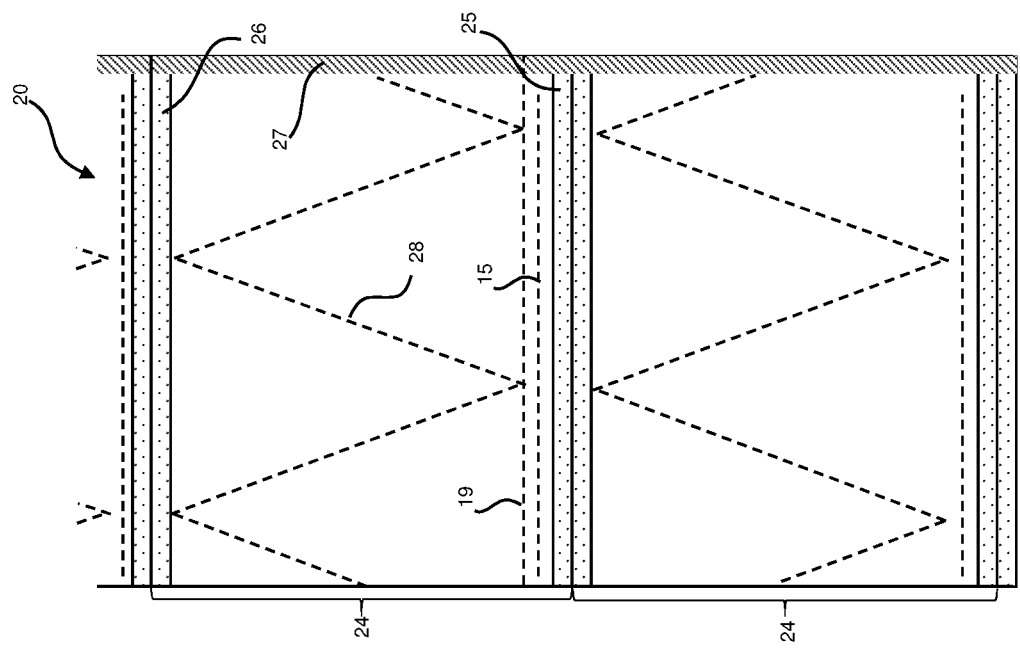
FIG. 4 is a planar view of a packaging material for producing a packaging container as shown in FIG. 2.

A web of packaging material 20 is shown in FIG. 4. The packaging material 20 is preferably comprising one or more layers of fibrous material, such as carton or paper, which is covered on both sides with a thermoplastic material, e.g. polyethylene. The side of the packaging material 20 that may be in contact with the food product in the packaging container may also comprise a layer of barrier material, e.g. an aluminium foil which is coated with a thermoplastic material.

The web of packaging material 20 forms a series of sections 24, each section 24 being configured to form an individual packaging container 10.

Each section 24 has a top sealing area 25, a bottom sealing area 26, and a longitudinal sealing area 27. The longitudinal sealing area 27 is configured to form the longitudinal seal 12 of the packaging container 10, while the top sealing area 25 and the bottom sealing area 26 are configured to form the top transversal seal 13 and the bottom transversal seal 14, respectively.

Each section 24 is also provided with folding lines 28, indicating the position of the corners of the tetrahedral package shape, and assisting in defining the outside décor of the packaging container 10, and a perforation 15. As can be seen in FIG. 4, the perforation 15 is arranged at a distance from the folding lines 28, thereby forming a certain area of the packaging material 20 to obtain the flat section 18. From the previous description, it should be realized that the imprint 19 will be formed approximately at the longitudinal position where the folding lines 28 start, indicated by the dashed line 19 in FIG. 4. It should however be understood that the imprint 19 is formed by means of the sealing device 100 in the filling machine, such that it is not present at the packaging material 20 shown in FIG. 4 before it is formed into a packaging container, but after.

From the description above follows that, although various embodiments of the invention have been described and shown, the invention is not restricted thereto, but may also be embodied in other ways within the scope of the subject-matter defined in the following claims.

The invention claimed is:

1. A sealing device for forming a transversal seal to a tetrahedral packaging container, comprising:
   a sealing element configured to provide a transversal seal to a packaging material of the packaging container;
   an imprint ruler arranged at a longitudinal distance from the sealing element, and
   a flattening section arranged between the sealing element and the imprint ruler and configured to flatten a portion of the packaging material having a perforation,
   wherein the imprint ruler protrudes from a surface of the sealing device relative to the flattening section by a protrusion length, and is movable relative to the flattening section such that the protrusion length is adjusted thereby providing an adjustment in length of the packaging container formed by the packaging material, and
   the imprint ruler is configured to provide a transversal imprint to the packaging material by compressing or folding the packaging material such that the portion having the perforation is arranged between the transversal imprint and the transversal seal, and such that the transversal imprint forms a barrier for content in the packaging container.

2. The sealing device according to claim 1, wherein the longitudinal distance between the sealing element and the imprint ruler is in a range of 5-25 mm.

3. The sealing device according to claim 1, wherein the distance between the sealing element and the imprint ruler is in a range of 10-20 mm.

* * * * *